A. G. GRAY.
MOWING-MACHINE.

No. 169,435. Patented Nov. 2, 1875.

WITNESSES:

INVENTOR:
A. G. Gray
BY
Munn & Co
ATTORNEYS.

UNITED STATES PATENT OFFICE.

ANDREW G. GRAY, OF ST. JOHN, CANADA.

IMPROVEMENT IN MOWING-MACHINES.

Specification forming part of Letters Patent No. 169,435, dated November 2, 1875; application filed August 6, 1875.

*To all whom it may concern:*

Figure 1:
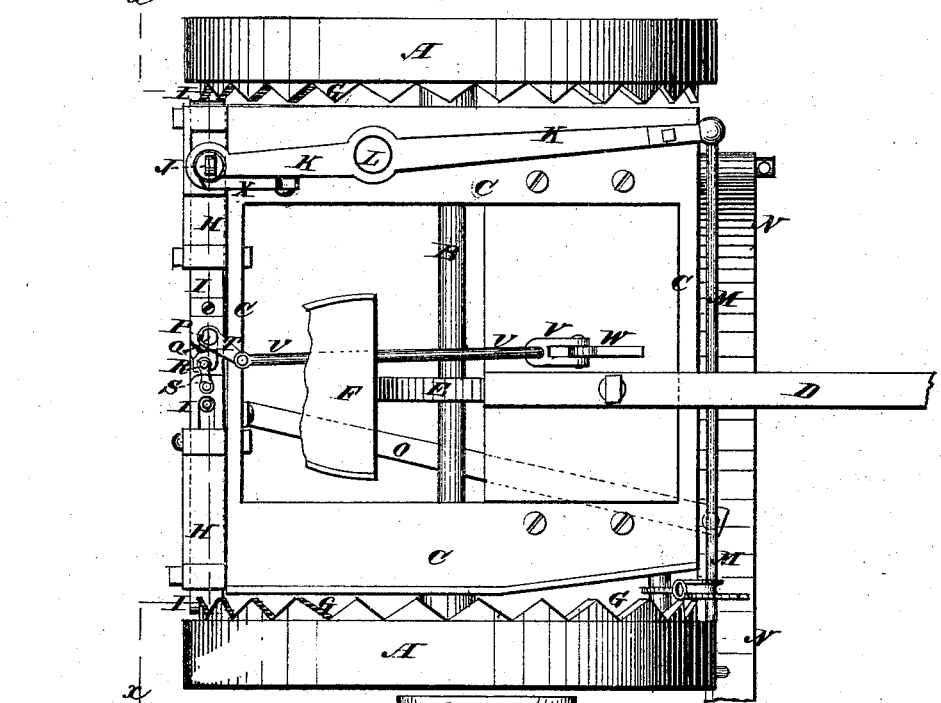
Figure 2:
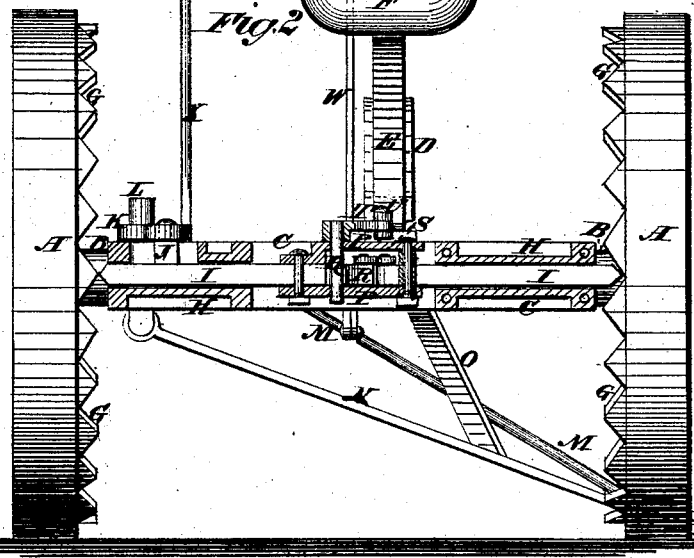

Be it known that I, ANDREW G. GRAY, of St. John, Province of New Brunswick and Dominion of Canada, have invented a new and useful Improvement in Mowing-Machines, of which the following is a specification:

Figure 1 is a top view of my improved machine, part being broken away to show the construction. Fig. 2 is a rear view of the same, partly in section, through the line $x\ x$, Fig. 1.

Similar letters of reference indicate corresponding parts.

The object of this invention is to furnish an improved mowing-machine, which shall be so constructed that the sickle-bar may be operated from the driving-wheels with a positive motion, and which will enable the cutter-bar to be readily thrown into and out of gear with the drive-wheels.

The invention consists in the combination of the notched wheels, the reciprocating bar, and the lever with the drive-wheels, the frame, and the sickle-bar pitman; in the combination of the connecting-bars, the short shaft, the cam, the pivoted connecting-bar, the crank-arm, the connecting-bar, and the lever with the inner ends of the two parts of the reciprocating bar; and in the combination of the bent lever with the open rear end of the vibrating lever and the pin of the reciprocating bar, as hereinafter fully described.

A are the drive-wheels, which are rigidly attached to the ends of the axle B, so that the said drive-wheels may revolve together. The axle B revolves in bearings attached to the frame C, to which the tongue D and the standard E of the driver's seat are attached. Upon the inner sides of the drive-wheels A, at or near their rims, are formed, or to them are attached, circles of saw-toothed notches G, which are so arranged that the projection of the one circle or wheel may be opposite the depressions of the other, as shown in Figs. 1 and 2. To the end parts of the rear side of the rear cross-bar of the frame C are attached two metal boxes, H, which are made hollow, and through the cavity of which passes a bar, I, the ends of which are beveled off, as shown in Fig. 2, and which is made of such a length that when one of its ends is in the bottom of a notch of one of the wheels G its other end may pass a projection of the other wheel G, so that the bar I may receive a reciprocating movement from the revolution of the wheels A G. To the bar I, near one end, is attached a pin, J, that passes up through a longitudinal slot in one of the boxes H, and the upper end of which passes through a hole in the rear end of the lever K. The lever K works upon a stud, L, attached to the frame C, and which passes through a hole in the said lever. To the forward end of the lever K is connected, by a ball-and-socket joint, the end of the pitman M, the other end of which is connected with and gives motion to the sickle-bar. N is the bar with which the cutter-bar is connected, and the inner end of which is hinged to the front bar of the frame C, near its farther end. The draft-strain upon the bar N is supported by the brace-bar O, the forward end of which is pivoted to the said bar N, and its rear end is pivoted to the rear cross-bar of the frame C. The bar I is made in two parts, the inner ends of which are connected by two bars, P, which are placed above and below the inner ends of the said parts, and are connected with said ends by two bolts, one of which passes through a hole in one of said ends, and forms a rigid connection. The other bolt passes through a longitudinal slot in the other of said parts, and forms a sliding connection. To the two bars P, between the inner ends of the parts of the bar I, is pivoted a short vertical shaft, Q, upon which, between the bars P, is formed a cam, R, to which is pivoted the end of a short bar, S, the other end of which is pivoted to the inner end of the slotted part of the bar I, so that by turning the shaft Q in one direction the two parts of the bar I will be drawn toward each other to throw their outer ends out of gear with the notches G, and by turning the said shaft Q in the other direction the two parts of the bar I will be pushed from each other to throw their outer ends into gear with the notches G. To the upper end of the shaft Q is rigidly attached a crank-arm, T, to which is pivoted the rear end of a connecting-rod, U. The forward end of the connecting-rod U is connected, by a coupling or clevis, V, with the lever W. The lower end of the lever W is pivoted to the lower end of a downwardly-projecting arm attached to the platform or frame-work of the machine. The upper end of the lever W projects into such a position that it may be conveniently reached and operated by the driver from his seat. One side of the rear end of the lever K may be cut away, as shown in Fig. 1, forming an opening, through which the pin J may pass out, so that the movement of the bar I will not move the sickle-bar. The opening in the rear end of the lever K is closed by the short arm of the bent lever X, which is pivoted at its angle to the edge of the lever K, and the long arm of which projects into such a position that it may be conveniently reached and operated by the driver.

Having thus described my invention, I claim as new and desire to secure by Letters Patent—

1. The combination of the notched wheels G, the reciprocating bar I, and the lever K with the drive-wheels A, the frame C, and the sickle-bar pitman M, substantially as herein shown and described.

2. The combination of the bars P, the short shaft Q, the cam R, the connecting-bar S, the crank-arm T, the connecting-bar U, and the lever W with the inner ends of the two parts of the reciprocating bar I, substantially as herein shown and described.

3. The combination of the bent lever X with the open rear end of the lever K and the pin J of the reciprocating bar I, substantially as herein shown and described.

ANDREW GEORGE GRAY.

Witnesess:
D. B. WARREN,
W. G. THOMAS.